(12) United States Patent
Chandrasekara et al.

(10) Patent No.: US 11,078,978 B2
(45) Date of Patent: *Aug. 3, 2021

(54) MOTOR BRAKE SYSTEM

(71) Applicant: Rockwell Automation Technologies, Inc., Mayfield Heights, OH (US)

(72) Inventors: Chetan Chandrasekara, Chanhassen, MN (US); Arun K. Guru, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,425

(22) Filed: Dec. 29, 2019

(65) Prior Publication Data

US 2020/0132149 A1 Apr. 30, 2020

Related U.S. Application Data

(63) Continuation-in-part of application No. 15/720,413, filed on Sep. 29, 2017, now Pat. No. 10,520,054.

(51) Int. Cl.
| | |
|---|---|
| *F16D 66/00* | (2006.01) |
| *H02K 7/102* | (2006.01) |
| *H02K 11/35* | (2016.01) |
| *G05B 19/19* | (2006.01) |
| *F16D 66/02* | (2006.01) |
| *F16D 55/22* | (2006.01) |
| *F16D 65/84* | (2006.01) |
| *F16D 55/00* | (2006.01) |

(Continued)

(52) U.S. Cl.
CPC .............. *F16D 66/00* (2013.01); *G05B 19/19* (2013.01); *H02K 7/102* (2013.01); *H02K 11/35* (2016.01); *F16D 55/22* (2013.01); *F16D 65/84* (2013.01); *F16D 66/021* (2013.01); *F16D 2055/0033* (2013.01); *F16D 2065/785* (2013.01); *F16D 2121/22* (2013.01); *G05B 2219/42284* (2013.01)

(58) Field of Classification Search
CPC .... F16D 49/02; F16D 66/024; F15D 65/0012; G01M 13/028; G01M 7/00; B60T 8/00; B60T 8/173; B60T 8/326; B60T 17/221
See application file for complete search history.

(56) References Cited

U.S. PATENT DOCUMENTS 5,372,221 A * 12/1994 Jalbert ................... B60T 17/22
188/1.11 L
5,387,031 A * 2/1995 Watanabe ............... B60T 8/175
303/163

(Continued)

FOREIGN PATENT DOCUMENTS

| EP | 2 422 103 B1 | 8/2014 |
|---|---|---|
| EP | 3 023 846 A1 | 5/2016 |

*Primary Examiner* — Helen C Kwok
(74) *Attorney, Agent, or Firm* — Fay Sharpe LLP

(57) ABSTRACT

A motor includes a housing containing a rotor and stator. A brake assembly is adapted to restrain rotation of the rotor. A brake controller includes a brake diagnostics system. At least one vibration sensor is located in the housing and provides vibration data to the brake diagnostics system in response to a brake operation cycle of the brake assembly. The vibration data is used by the brake diagnostics system to assess an operative condition of the brake assembly.

7 Claims, 10 Drawing Sheets

(51) Int. Cl.
*F16D 121/22* (2012.01)
*F16D 65/78* (2006.01)

(56) References Cited

U.S. PATENT DOCUMENTS

| | | | | |
|---|---|---|---|---|
| 5,865,515 | A * | 2/1999 | Nishizawa | B60T 17/221 |
| | | | | 188/73.36 |
| 5,952,564 | A * | 9/1999 | Naito | B60T 8/173 |
| | | | | 73/115.01 |
| 6,202,804 | B1 | 3/2001 | Dropmann et al. | |
| 6,802,402 | B2 | 10/2004 | Bausch et al. | |
| 8,219,283 | B2 * | 7/2012 | Recker | B62D 5/0472 |
| | | | | 701/41 |
| 8,245,609 | B1 * | 8/2012 | Greenwald | G05B 19/409 |
| | | | | 82/112 |
| 8,782,877 | B2 | 7/2014 | Gebhart | |
| 8,985,283 | B2 * | 3/2015 | Oshio | B60T 8/3255 |
| | | | | 188/72.1 |
| 10,520,054 | B2 * | 12/2019 | Chandrasekara | G01M 13/028 |
| 2003/0010583 | A1 | 1/2003 | Arnold et al. | |
| 2005/0205712 | A1 | 9/2005 | Aisenbrey | |
| 2007/0163851 | A1 | 7/2007 | Alexander | |
| 2010/0030490 | A1 * | 2/2010 | Wright | F16D 66/02 |
| | | | | 702/34 |
| 2010/0250081 | A1 * | 9/2010 | Kinser | B60T 8/00 |
| | | | | 701/70 |
| 2011/0226105 | A1 | 9/2011 | Butler et al. | |
| 2012/0146333 | A1 | 6/2012 | Bywaters et al. | |
| 2012/0285777 | A1 * | 11/2012 | Oshio | F16D 65/12 |
| | | | | 188/72.1 |
| 2013/0277157 | A1 | 10/2013 | Huang et al. | |
| 2014/0095037 | A1 | 4/2014 | Seto et al. | |
| 2014/0367967 | A1 | 12/2014 | Ossyra | |
| 2018/0251103 | A1 | 9/2018 | Satterthwaite et al. | |

\* cited by examiner

MOTOR BRAKE SYSTEM

CROSS-REFERENCE TO RELATED APPLICATION

This application is a continuation-in-part of U.S. application Ser. No. 15/720,413 filed Sep. 29, 2017, now assigned U.S. Pat. No. 10,520,054, and the entire disclosure of said prior application is hereby expressly incorporated by reference into the present specification.

BACKGROUND INFORMATION

The present development is described with primary reference to servo motors but is applicable to other types of motors. Accordingly, it is not intended that the present development be limited to servo motors unless specified as such.

Rotary servo motors and other motors are widely known and used to provide rotary motion control for industrial machinery and other applications. A rotor rotates relative to a stator in response to control input commands from a motor drive. An output shaft of the servo motor is operably connected to the rotor to rotate therewith. The output shaft projects outwardly from or is otherwise accessible at the motor housing at a front end. A position and/or speed feedback device, often referred to as an "encoder," is operatively associated with the output shaft of the motor at an opposite rear end of the motor housing and provides feedback to the motor drive as to the angular position of the output shaft and rotor such that rotation of the output shaft is further controlled in response to the feedback to obtain a precise desired angular position for the rotor and output shaft connected thereto. Servo motors often further include a holding brake that is selectively applied after the rotor is stopped in the desired angular position to hold the output shaft and rotor in such desired angular position and/or a motor can include a stopping brake used to stop rotation of the rotor and components connected thereto.

FIG. 1 shows such a conventional servo motor M' comprising a housing H' with a front wall FW', a rear wall RW', and a side wall SW' that can be rectangular, cylindrical or otherwise shaped in cross-section and that extends axially between and interconnects the front wall FW' and rear wall RW'. Between the front wall FW', rear wall RW' and side wall SW', the housing defines a hollow interior space SP' in which a stator ST' is supported. A rotor RT' is rotationally supported inside the stator ST', and the rotor RT' is operably coupled to an output shaft OS' such that the output shaft OS' rotates directly or indirectly with the rotor RT' when the motor is energized. The output shaft OS' extends axially or longitudinally in the motor housing H' along a longitudinal axis X' and is rotationally supported by a front bearing FB' located adjacent the front wall FW' and a rear bearing RB' that is spaced inwardly or rearwardly toward the rear wall RW' with respect to the front bearing FB'. The front bearing FB' is typically located in a front end cap. The output shaft OS' extends outside of the housing space SP' through the front wall FW' of the motor housing H' and is adapted to be operably coupled to an associated machine or other structure to be rotated by the output shaft OS'. The motor housing H' extends axially or longitudinally along the longitudinal axis X' of the output shaft OS', and the motor housing H' includes a mid-point MP' located halfway between the front wall FW' and rear wall RW' along the longitudinal axis X'.

The motor housing H' includes a front end FE' adjacent the front wall FW' and includes a front region FR' that extends between the front wall FW' and the housing mid-point MP'. Similarly, the motor housing H' includes a rear end RE' adjacent the rear wall RW' and includes a rear region RR' that extends between the rear wall RW' and the housing midpoint MP'. The motor housing H' includes one or more mounting flanges MF' or other mounting structures located adjacent the front end FE' including apertures defined therein for receiving respective fasteners for securing the housing to an associated machine or other support T' for use of the motor M'. In certain installations, as shown in FIG. 1, the rear end RE' of the motor housing H' is unsupported by an associated mounting structure such that the rear end RE' and rear region RR' of the housing are cantilevered relative to the front end FE' of the housing.

The output shaft OS', which can comprises a single shaft or multiple interconnected shaft portions, is rotationally supported in the interior space SP' of the motor housing H' by a front bearing FB' located in the front region FR' of the housing H' and by a rear bearing RB' located in the rear region RR' of the housing. The motor M' further comprises a position and/or speed feedback device such as an encoder E' located in the housing rear region RR' and operatively associated with the output shaft OS'. The encoder E' senses or detects the angular position of the output shaft OS' as the output shaft rotates about the axis X'. The motor M' comprises an electrical power and data connector C' for communicating power to the windings of the stator and for communicating data between the encoder E' and an associated motor drive system through one or more associated cables, such as a single cable that includes multiple separate conductors for powering the windings of the motor, for controlling the brake assembly BA', and for carrying feedback data and temperature data. The connector C' can be provided as part of a removable cap that covers the encoder E'. A wall (not shown) separates the encoder E' from the rear bearing RB'. In one example, a rear end cap is connected to the housing H' and holds the rear bearing RB' on an inner side and holds the encoder or other feedback device E' on the opposite outer side.

The motor M' further comprises a brake or brake assembly BA' for selectively braking or holding the output shaft OS' so that the output shaft OS' is prevented from rotating and is held in a fixed angular position when the brake assembly BA' is engaged. The brake assembly BA' is located in the housing rear region RR' near the rear bearing RB' and encoder E', and can be fixedly secured to a rear end cap. The location of the brake assembly BA' in the rear region RR' of the motor housing H' has been deemed to be suboptimal in certain instances because the brake assembly BA' generates significant heat and brake dust that can degrade the performance and lifespan of the encoder E'. Also, the mass of the brake assembly BA' located in the cantilevered rear region RR' of the motor housing H' can lead to increased vibrations in the output shaft OS' and motor M' overall.

In a typical arrangement, as shown in FIG. 2, the brake or brake assembly BA' comprises a brake housing 10' that secured to the motor housing H' in the space SP' by one or more fasteners. The brake housing 10' includes a base 12' and a backing plate 14' that is secured to the base 12' by a plurality of fasteners 14f (only one fastener 14f is shown in FIG. 2) such that the backing plate 14' is axially spaced from the base 12'. Both the base 12' and backing plate 14' are annular in general structure, and the motor output shaft OS' extends coaxially through both the brake assembly base 12' and backing plate 14'. A brake hub 20' is keyed, splined, or otherwise connected to the motor output shaft OS' to rotate therewith, or the hub 20' is integrally provided as part of the output shaft OS'.

The brake assembly BA' further comprises a movable armature 30', typically an annular plate structure that is coaxially located about the hub 20' and output shaft OS', but that is axially movable along the longitudinal axis X' of the output shaft OS'.

The brake assembly BA' also includes one or more springs 36' operably positioned in the base 12' that operate between the base 12' and the armature 30' to continuously bias and urge the armature 30' toward its engaged position, away from the base 12' and toward the backing plate 14'. The spring(s) 36' can comprise a plurality of axially extending coil springs arranged circumferentially about the base 12' or can comprise another spring arrangement such as, e.g., a disc spring coaxially positioned about the output shaft OS' between the base 12' and the armature 30'. Alternatively, the brake assembly BA' can be a permanent magnet brake assembly in which the spring(s) 36' is replaced by one or more permanent magnets that urge the armature 30' into its engaged position.

An annular brake rotor 40' is engaged with the hub 20'. In particular, the rotor 40' comprises an inner or hub portion 42' that is keyed, splined, or otherwise operably coupled to the hub 20' to rotate with the hub 20' and slide axially relative to the hub 20' such that the brake rotor 40' is axially slidable or movable relative to the hub 20' along the longitudinal axis X'. The rotor 40' is positioned axially between the armature 30' on one side and the backing plate 14' on the other opposite side. Typically, a friction material is included on one or both opposite faces of the rotor 40' and/or on the faces of the armature 30' and/or backing plate 14' that are oriented toward the rotor 40' such that when the rotor 40' is urged by the armature 30' into abutment with the backing plate 14' and the armature 30' clamps the rotor 40' into abutment with the backing plate 14', the rotor 40' is prevented from rotating about the axis X' which prevents the hub 20' and output shaft OS' from rotating about the longitudinal axis X'.

The brake assembly BA' is normally engaged or in its "engaged" or "on" configuration because armature 30' is normally spring-biased by the biasing spring(s) 36' toward and into an engaged position where the armature 30' firmly urges the brake rotor 40' into engagement with the backing plate 14' such that the rotor 40' is tightly captured or sandwiched between the armature 30' and the backing plate 14' (together with the friction material) and such that the rotor 40' is restrained against rotation about the longitudinal axis X' of the output shaft OS'. When the rotor 40' is restrained against rotation, the output shaft OS', itself, is also restrained and prevented from rotating about the longitudinal axis X'.

To release or disengage the brake assembly BA' so that it is in its "disengaged" or "off" configuration, the brake assembly BA' further includes at least one electromagnetic coil 50' located in the brake housing base 12'. The coil 50' is selectively energized by the associated motor drive system connected to the motor M' to establish an electromagnetic force about the coil 50'. Because the armature 30' comprises a magnetic metal or other magnetic material, when the coil 50' is energized, the electromagnetic force of the coil 50' draws the armature 30' toward its disengaged position, i.e., toward the brake housing base 12' away from the brake rotor 40' and backing plate 14', into a disengaged or released position against the biasing force of the spring(s) 36' (or against the biasing force of the permanent magnets if used in place of the spring(s) 36'). When the armature 30' is moved into its disengaged position and held in its disengaged position by the electromagnetic force of the coil 50', the brake rotor 40' is released and disengaged from the armature 30' and backing plate 14' and the rotor 40' slides axially away from the backing plate 14' sufficiently to allow the rotor 40' to rotate about the longitudinal axis X', along with the hub 20' and output shaft OS' of the motor M'.

When the brake assembly BA' is a holding or parking brake, the brake assembly BA' is not engaged until the output shaft OS' has stopped rotating or at least substantially stopped rotating, i.e., the brake assembly BA' is typically not used to stop a rotating rotor 40'. The brake assembly BA' is also typically released before the motor M' is again energized to rotate the output shaft OS' so that the brake BA' is never in its engaged or "on" while the output shaft OS' is being rotationally driven. In some cases, the brake assembly BA' acts as a stopping brake that slows and stops the rotor 40' when the brake assembly BA' is engaged.

Motor brakes as described above have heretofore been associated with certain drawbacks. As noted, known brake assemblies BA' are mounted in the rear region RR' of the motor M' near the encoder E'. In some applications, the motor M' is mounted to an associated support structure by a mounting flange MF' or the like that is located at the front end FE' of the motor, and the opposite rear end RE' of the motor is unsupported and cantilevered outwardly relative to the front end FE'. In such case, the significant cantilevered mass of the brake assembly BA' can sometimes lead to undesired vibration or misalignment of the output shaft OS' during use of the motor M', both of which can lead to operational drawbacks and can increase wear and degrade motor performance and operational life.

Also, a motor brake BA' as described generates significant heat due to the need to energize the brake coil 50' repeatedly to release the brake assembly BA' and to hold the brake assembly BA' in its released position during rotation of the output shaft OS'. Known servo motor brake designs and locations lead to such heat being transmitted to the encoder E', which can degrade performance and lifespan of the encoder E'. Furthermore, such known designs are suboptimal in terms of brake cooling and capture too much heat in the motor housing H'. Also, locating the brake assembly BA' adjacent the encoder E' can cause brake dust to contaminate the encoder which can reduce its life, increase heat, and reduce its lifespan and performance.

In addition, the motor brake assembly BA' and other known designs do not provide desired feedback or diagnostic information about the health and performance of the brake BA', itself, such as brake release, brake dragging, and shorts in the brake coil. As such, an unexpected brake failure can cause an unscheduled malfunction of the motor M', which is highly undesired in applications such as manufacturing, entertainment, transportation, and the like.

Accordingly, it has been deemed important to provide a motor brake system that increases safety of people in fields such as entertainment, manufacturing, and the like through advanced diagnostic monitoring, preventing unexpected failures, improved protection, higher utilization and increased availability of assets. This is especially important for applications where gravity assisted and vertically hanging loads are present, such as in entertainment or in industrial automation applications for packaging, converting, robotics, machine tooling, conveyors, cranes, etc. A need has been identified for improving safety integrity of brake control (improved Safety Integrity Level (SIL) rating), reducing vibration and improving thermal performance of servo motors and other motors. The present development as described below provides the above-noted benefits and advantages and others while providing better overall results. As such, a motor brake must function properly over the life of the motor, and any performance degradation of the motor brake must be identified early to ensure that the motor brake can be monitored and repaired if necessary.

SUMMARY

In accordance with one aspect of the present development, a motor includes a housing including a rotor and stator. The motor includes a brake assembly that is adapted to restrain rotation of the rotor. The motor also includes a brake controller with a brake diagnostics system. At least one vibration sensor is located in the housing and provides vibration data to the brake diagnostics system in response to a brake operation cycle of the brake assembly. The sensed vibration data is used by the brake diagnostics system to assess an operative condition of the brake assembly.

In accordance with another aspect of the present development, a brake condition diagnostic method for an electric motor includes sensing vibration data from a vibration sensor located in a housing of a motor during a sensing window when a brake assembly of the motor cycles between an engaged condition and a disengaged condition. The vibration data are filtered to isolate a low frequency region of interest and a high frequency region of interest. The filtered vibration data are converted to a frequency domain. An operative condition of the brake assembly is assessed based upon at least one feature of said vibration data in said frequency domain.

DETAILED DESCRIPTION

Figure 1:
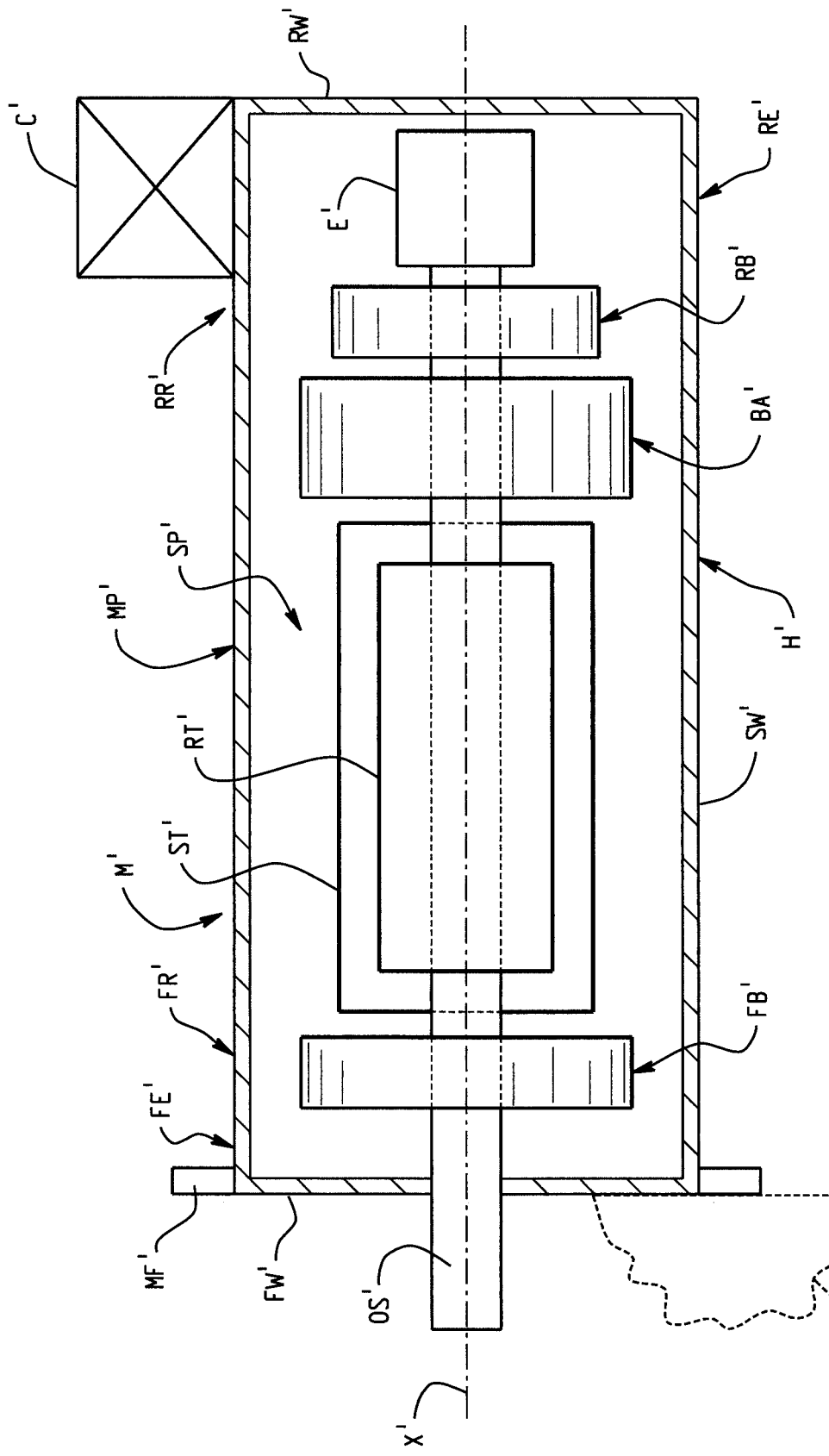
FIG. 1 shows a conventional motor including a brake assembly.
Figure 2:
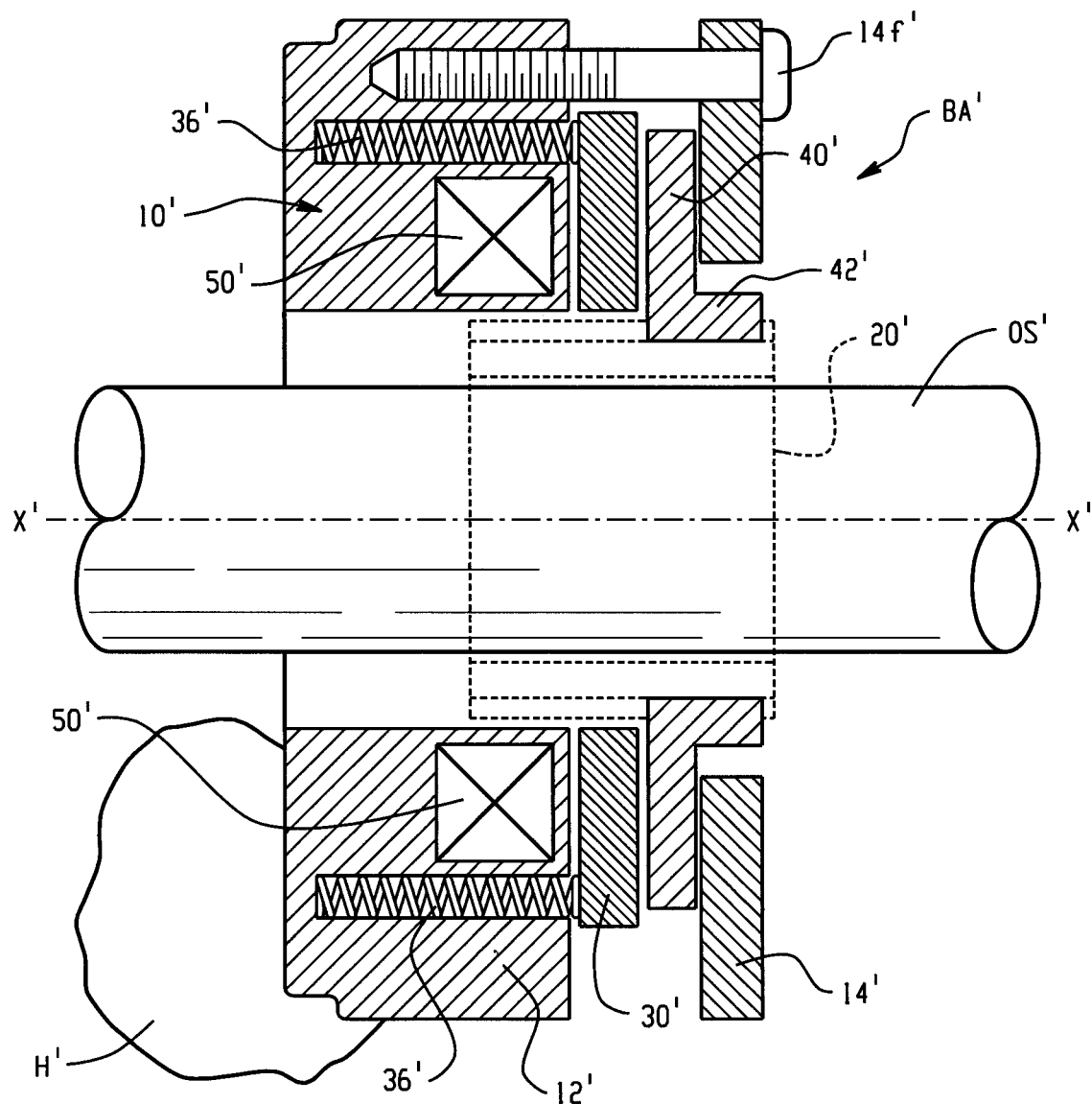
FIG. 2 is an enlarged partial section view of a known brake assembly such as used in the motor of FIG. 1.
Figure 3:
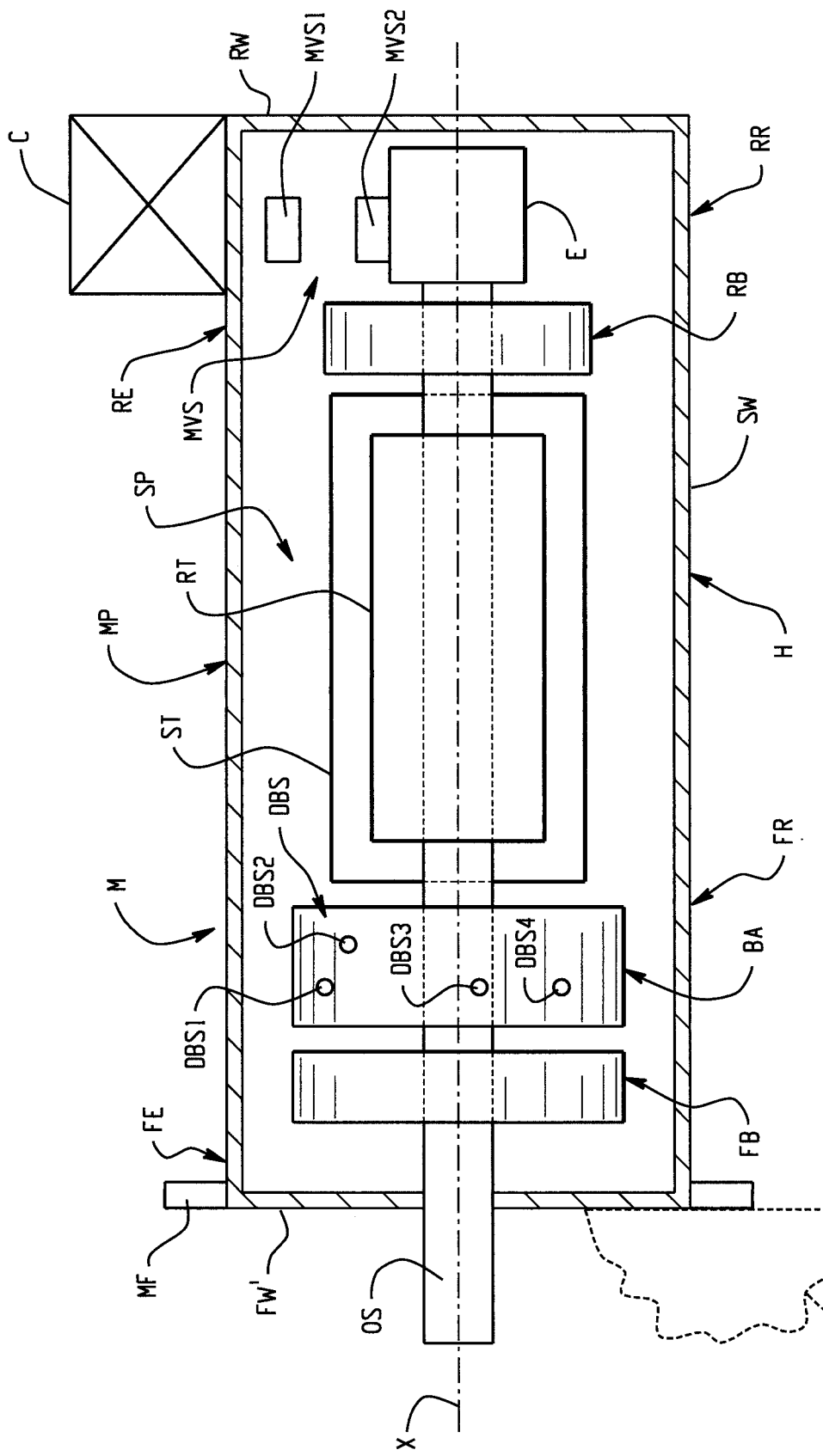
FIG. 3 shows a motor including a brake assembly in accordance with one embodiment of the present development.
Figure 4:
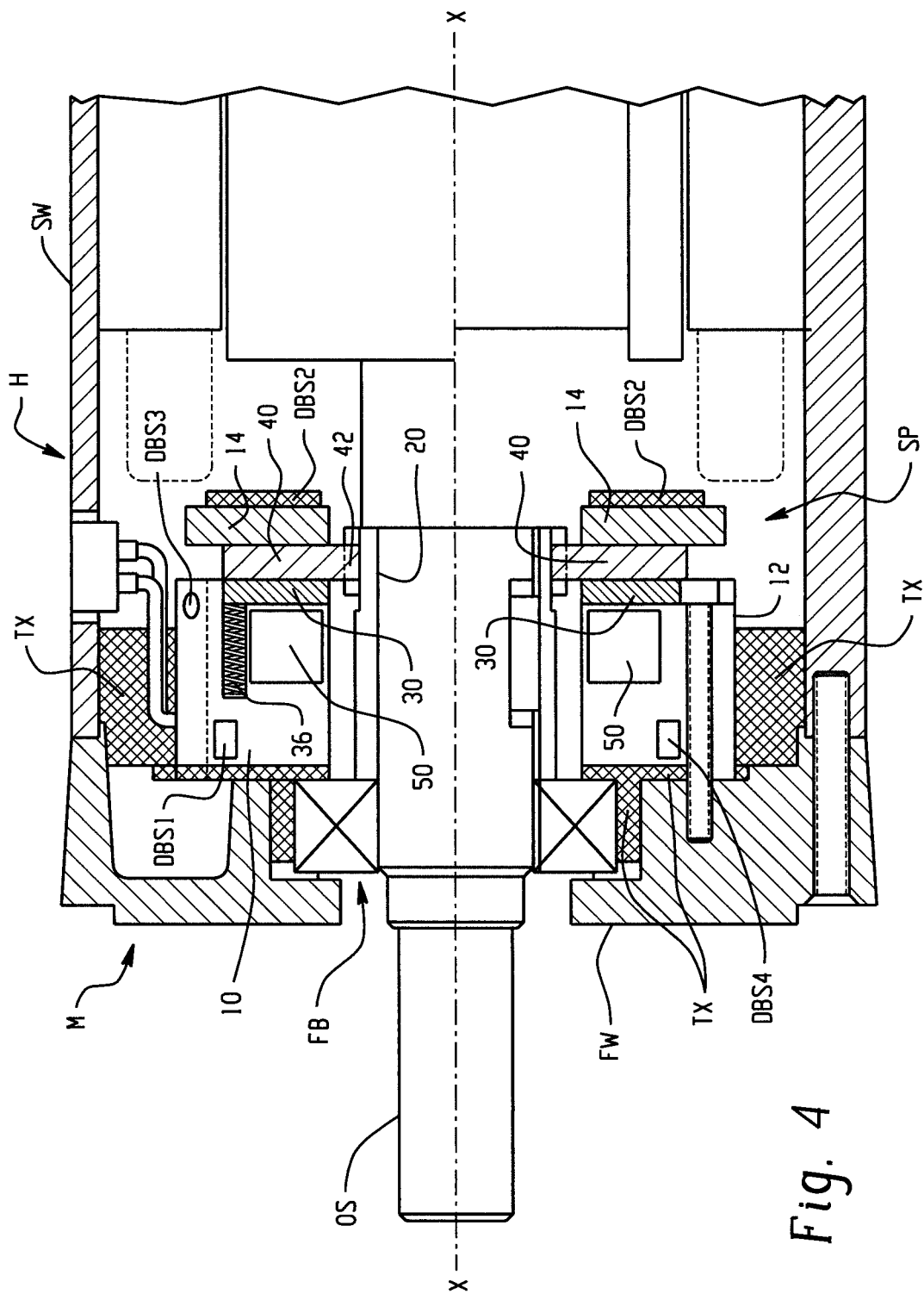
FIG. 4 is a partial section view of a motor including a brake assembly, corresponding to FIG. 3.

FIG. 3 shows a motor M such as a servo motor or other type of motor including a brake assembly BA in accordance with one aspect of the present development. Like components of the motor M relative to the above-described motor M' are identified with like reference characters that omit the primed (') designation and, in some cases, such like components are not described again here, in which case the above-description applies unless otherwise shown and/or described herein. FIG. 4 is an enlarged, partial section view of a front end of the motor M of FIG. 3. The motor M is described and shown herein as a servo motor, but it can be any other type of motor according to the present development.

As shown in FIGS. 3 and 4, the illustrated motor M optionally differs from the motor M' in that the brake assembly BA is located in the front region FR of the motor housing H instead of the rear region RR, although the motor M can alternatively include the brake assembly BA in the rear region RR of the motor housing H, or the brake assembly BA can be located external to motor housing H. In particular, the brake assembly BA is located in the front region FR of the motor housing H, between the front bearing FB and the stator ST and between the midpoint MP of the housing and the front wall FW, wherein the midpoint is defined as the axial location along the axis of rotation X' halfway between the front wall FW and rear wall RW. As such, a maximum distance between the brake assembly BA and the front wall FW is less than a maximum distance between the brake assembly BA and the rear wall RW, and the brake assembly BA is located entirely in the front region FR of the housing H, between the midpoint MP and the front wall FW. This new location for the brake assembly BA moves the large mass of the brake assembly BA closer to the front end FE of the motor to reduce the mass of the rear end RE of the motor, which reduces vibration of the motor housing H and output shaft OS in applications where the rear end RE of the motor is unsupported and cantilevered relative to the mounting flanges MF located at the front end FE of the motor M.

FIG. 4 further shows the brake assembly BA, unlike known motors M' and brake assemblies BA', includes a thermally conductive resilient or compliant pad or layer of material TX such as silicone-based or other elastomeric material located between and filling a space between the brake housing 10 and the motor housing H (at least in the region of the brake housing base 12 as shown) to provide a direct, uninterrupted thermal pathway from the brake housing 10 and to the motor housing H such that heat generated by the brake assembly BA is conducted directly from the brake assembly BA to the motor housing H through the thermal pad layer TX without traversing any insulative air gaps or spaces, and the large mass and surface area of the metal housing H conducts heat efficiently to the surrounding ambient atmosphere as a heat-sink. If desired, cooling fins or other surface area enlargements can be included on the walls FW, RW, SW of the motor housing H to improve transfer of heat from the housing H to the ambient air. The thermally conductive pad material TX can also be located between the backing plate 14 of the brake assembly BA and an adjacent part of the motor housing H and/or other components located in the motor housing H to provide an additional uninterrupted thermal pathway from the backing plate 14 to the motor housing H. The thermally conductive resilient pad TX is also preferably located between and fills the space between the brake housing base 12 and the front bearing FB to provide a direct uninterrupted thermal pathway between the brake housing and the front bearing FB, to transmit heat from the brake housing base 12 to the front bearing FB, and from the front bearing FB to the motor housing H, preferably with thermal pad material TX also located between the front bearing FB and the housing H. In all cases, the thermally conductive pad TX provides a direct, uninterrupted thermal conduction pathway between the brake assembly housing 10 and the motor housing H, front bearing FB, and/or other adjacent components or structures located in the motor housing H. The thermally conductive pad material TX is resiliently compliant to fills any air gaps between the brake assembly housing 10 and the motor housing H, front bearing FB, or other structure in contact with the thermal pad material TX. The front bearing FB also provides a thermal pathway to the output shaft OS such that the output shaft OS also conducts heat away from the brake assembly BA by way of the front bearing FB.

Unlike the motor M', a motor M in accordance with an embodiment of the present development also includes one or more direct brake sensors DBS connected to the brake assembly BA for directly monitoring one or more operating conditions or operating parameters of the brake assembly BA. FIGS. 3 and 4 show a first direct brake sensor DBS1 that comprises a temperature sensor connected to the brake housing 10. A second direct brake sensor DBS2 comprises a strain gauge or other pressure sensor such as a microelectromechanical (MEMS) pressure sensor connected to the backing plate 14 or other part of the housing 10 or brake assembly BA for measuring and sensing the biasing force at which the springs 36 urge the armature 30 and rotor 20 toward and into abutment with the backing plate 14. The third direct brake sensor DBS3 comprises a contact or non-contact switch such as a micro-switch connected to the housing base 12 for detecting movement of the armature 30 and/or rotor 20 to and from their respective engaged and disengaged positions. A fourth direct brake sensor DBS4 comprises an accelerometer or other vibration sensor connected to the housing 10 or other part of the brake assembly BA for measuring vibration in the brake assembly BA. In one example, the fourth direct brake sensor DBS4 comprises a 3-axis accelerometer such as a MEMS vibration sensor, pressure sensor, or the like.

As shown in FIG. 3, the motor M further includes a plurality of sensors including one or more motor vibration sensors MVS1, MVS2 located outside the brake assembly BA, but inside the housing H. The first motor vibration sensor MVS1 is located in the housing space SP, and the second motor vibration sensor MVS2 is connected to the encoder or other position feedback device E. In one example, the motor vibration sensors MVS1, MVS2 each comprise a MEMS vibration sensor or the like, such as a 3-axis accelerometer sensor. In one embodiment, the vibration sensors MVS1,MVS2 include a piezo accelerometer. In another embodiment, one or more of the vibration sensors MVS1,MVS2 comprise acoustic sensors or ultrasonic acoustic sensors such as a microphone or ultrasound sensor located in the housing and providing acoustic output data (sonic vibration data or ultrasonic vibration data) such as an electrical output signal that varies with the sensed sonic or ultrasonic vibration data to the brake diagnostics system in response to a brake operation (engage or disengage) cycle of the brake assembly BA, wherein said acoustic data is used by the brake diagnostics system BD as described below to assess an operative condition of the brake assembly.

Figure 5:
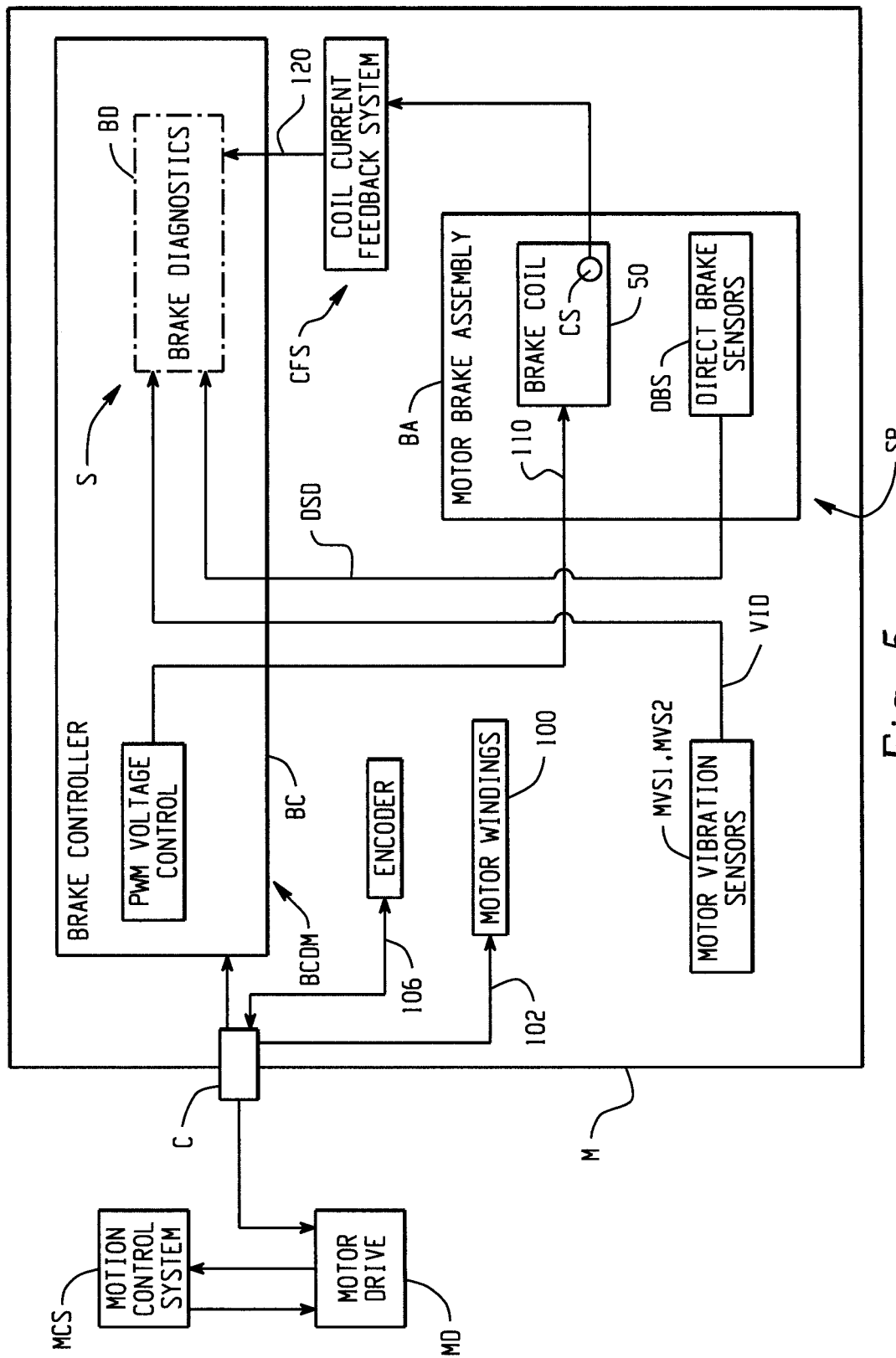
FIG. 5 is a block diagram showing a motor brake monitoring and diagnostic system according to an embodiment of the present development.

FIG. 5 is a block diagram showing a servo motor brake monitoring and diagnostic system S according to an embodiment of the present development. The motor M is operably connected to an electronic motion control system MCS such as an industrial automation control system or other electronic control system or processor. The motion control system MCS is operably connected to a motor drive MD which comprises electronic circuitry for controlling the motor M and brake assembly BA thereof in response to control inputs received from the motion control system MCS. Typically, the motor drive MD selectively energizes the motor windings 100 of the stator ST to drive the rotor RT in clockwise or counterclockwise directions using pulse width modulation (PWM) voltage signals 102 output by the motor drive MD. The motor drive MD receives feedback or error signals 106 from the encoder E or other feedback device indicating the actual angular position of the rotor RT and output shaft OS, and continuously alters the PWM voltage signals 102 in response to the feedback received from the encoder E to reduce the error to zero at which time the output shaft OS is located in the specified angular position input by the motor drive MD.

The motor M comprises a brake controller BC as a part thereof. The brake controller BC comprises one or more electronic circuits for receiving input from the motor drive MD as to the desired state of the brake assembly BA (i.e., brake engaged/"on" or brake disengaged/"off"), and the brake controller BC either energizes or de-energizes the brake electromagnetic coil 50 to control the brake assembly BA accordingly as generally described above for known brake assembly BA, using a coil control voltage signal 110 such as a pulse width modulation (PWM) voltage signal.

Unlike known systems, however, the motor M comprises a brake coil current feedback system CFS including a current sensor CS operatively associated with the brake coil 50 and operably connected to the brake controller BC. The coil current feedback system CFS senses electrical current flowing through the brake coil 50 and provides a coil current feedback signal or level 120 to a brake diagnostics module BD of the brake controller BC (the brake controller BC and brake diagnostics module BD are sometimes referred to herein together as a brake control and diagnostics module BCDM). The coil current feedback signal 120 indicates the magnitude or level (amperage) of current flowing in the brake coil 50 such that a magnitude of the coil current feedback signal 120 varies in proportion with the magnitude of current flowing through the brake coil 50. The brake diagnostics module BD compares the magnitude or level of the coil current feedback signal 120 to a known, stored minimum holding current magnitude or level (amperage) required to generate the required electromagnetic force to hold armature 30 to its disengaged position and maintain the armature 30 in its disengaged position or state against the biasing force of the springs 36. If the brake diagnostics module BD determines that the coil current feedback signal 120 indicates a current magnitude flowing in the coil 50 that is greater than the minimum holding current magnitude, the brake controller BC, via pulse-width-modulation (PWM) control, reduces the voltage input 110 to the brake coil 50, which correspondingly reduces the magnitude of electrical current flowing in the coil 50. If the brake diagnostics module BD determines that the coil current feedback signal 120 indicates a current magnitude flowing in the coil 50 that is less than the minimum holding current magnitude, brake controller BC, via PWM control, increases the voltage input 110 to the brake coil 50, which correspondingly increases the electrical current flowing in the coil 50. Using this coil current feedback system CFS and method, the voltage input to the coil 50 is maintained at a minimum level required to hold the armature 30 in its disengaged position, which desirably reduces power consumed by the coil 50 and reduces heat generated by the coil 50.

Figure 6:
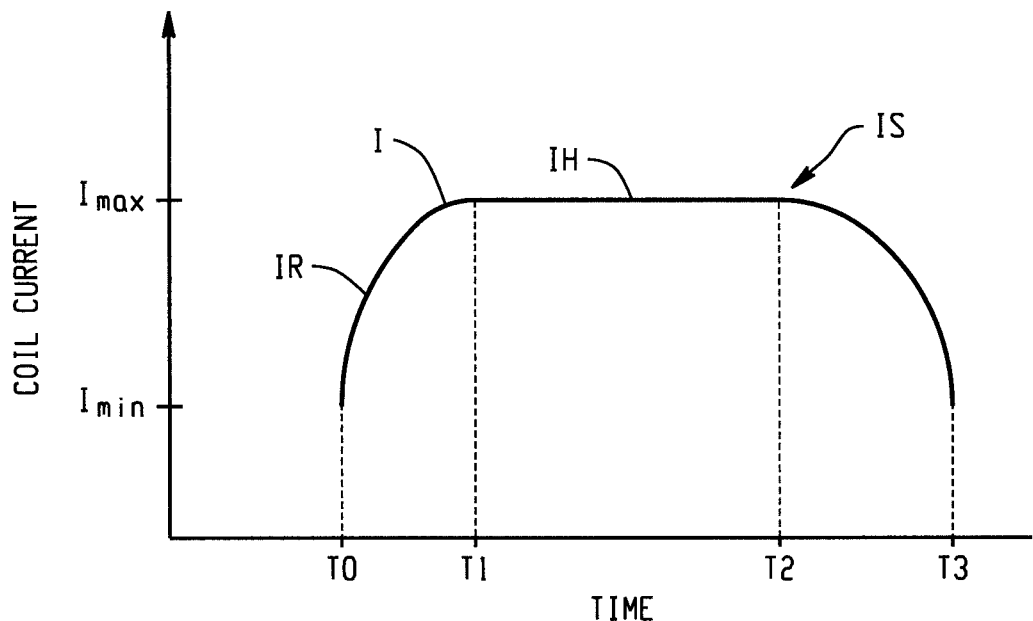
FIG. 6 is a graph that shows brake coil current curve during a normal brake cycle for a properly functioning motor brake.

In addition to monitoring the current flowing in the brake coil 50 by way of the coil current feedback sensor CS, the brake diagnostics module BD further analyzes the current flowing in the brake coil 50 using the coil feedback current 120 to compare the current spectrum of the current flowing in the brake coil 50 with a stored normal or ideal coil current spectrum IS as shown in FIG. 6 such that the coil current feedback signal 120 is compared to at least one stored brake coil current value. The stored ideal coil current spectrum IS indicates a preferred coil current magnitude or level I (amperage) flowing in the brake coil 50 for each moment in time when the brake coil 50 is energized during a brake disengagement cycle, i.e., a brake operation cycle in which the brake assembly is energized to be disengaged or released. The brake diagnostics module BD continuously or periodically compares the stored coil current spectrum IS with the current actually flowing in the brake coil 50 as indicated by the coil current feedback signal 120 when the brake coil 50 is energized to disengage the brake assembly BA. A deviation or discrepancy between the current flowing in the brake coil 50 as indicated by the coil feedback current 120 and the stored current spectrum IS is identified by the brake diagnostics module BD as being degradation and/or malfunction of the brake assembly BA.

FIG. 6 is a graph that shows an ideal coil current spectrum IS during a normal disengagement cycle of the brake assembly BA in which the brake assembly BA changes state from engaged to disengaged, and back to engaged during a brake disengagement cycle time period T0-T3. The ideal current spectrum IS is located in an amperage range defined between a minimum current level $I_{min}$ and a maximum current level $I_{max}$. It can be seen that coil current amperage magnitude I increases regularly over time in a ramp-up time period T0-T1 as indicated at IR when the brake coil 50 is first energized by the coil control voltage to disengage the brake assembly BA. The coil current I is then maintained in a steady state at select holding level or holding magnitude or within a select holding magnitude range during a holding time period T1-T2 during which time the brake coil 50 is energized to maintain the brake armature in its disengaged position. In a shut-off time period T2-T3, the coil current magnitude I drops as the brake coil 50 is de-energized so that the spring(s) 36 overcome the electromagnetic force generated by the brake coil 50 and again engage the brake assembly BA.

As described above, at least during the holding time period T1-T2, the coil current feedback signal 120 is monitored by the brake diagnostics module BD and compared to the ideal current spectrum IS, and the brake controller BC varies the coil control voltage signal 110 input to the brake coil 50 such that the coil current feedback signal 120 is maintained at the select holding magnitude level (or within a select holding magnitude range) IH with a minimum amount of voltage input to the brake coil 50 via pulse width modulation PWM of the coil control voltage 110. This coil current controlled feedback process minimizes the power consumed by the brake coil 50 and thus minimizes the heat generated by the brake coil 50.

In one embodiment of the present development, the magnitude of the coil current feedback signal 120 is monitored over the brake disengagement cycle time period T0-T3 and the coil current feedback signal magnitude 120 is compared to a normal coil current feedback spectrum IS such as that shown in FIG. 6. Variations of the coil current feedback signal 120 relative to the normal coil current feedback spectrum IS at a given time in the brake disengagement cycle T0-T4 are used by the brake diagnostics module BD to indicate performance degradation and/or malfunction of the brake assembly BA. For example, a coil current feedback signal 120 lower than the normal coil current feedback spectrum IS at a certain time between T0 and T3 is determined by the brake diagnostics module BD to be due to increased resistance in the brake coil 50 due to a break or other problem with the windings of the brake coil 50. A coil current feedback signal 120 higher than the normal coil current feedback spectrum IS at a certain time between T0 and T3 is determined by the brake diagnostics module BD to be due to decreased resistance in the brake coil 50 due to a short or other problem with the windings of the brake coil 50, or due to increased friction or drag during movement of the armature 40 from its engaged position to its disengaged position. In general, when the brake diagnostics module BD detects deviations of the coil current feedback signal 120 relative to the normal or ideal coil current feedback spectrum IS by a select amount, the brake diagnostics module BD assess such variations as a fault or error condition of a severity that varies correspondingly with the magnitude of the variation of the coil current feedback signal 120 relative to the normal coil current feedback spectrum CCFS. In one embodiment, the coil current feedback spectrum IS is statistically sampled and monitored for long-term trend analysis to detect changes in the current feedback spectrum over time.

With continuing reference to FIG. 5, the motor M includes one or more direct brake sensors DBS connected to the brake assembly BA for directly monitoring one or more operating conditions or operating parameters of the brake assembly BA. In use, each direct brake sensor DBS continuously or periodically provides direct sensor data DSD to the brake diagnostics module BD indicating the magnitude, state, or condition being sensed, including temperature of the brake assembly BA, biasing force or pressure exerted by the biasing springs 36 on the armature 30, and/or a position of the armature 30 and/or rotor 40. The brake diagnostics module BD compares the received direct sensor data DSD to stored normal or optimum target values or stored normal or optimum target ranges that indicate a normal or optimum value or normal or optimum range for each parameter being sensed by a direct brake sensor DBS. If the direct sensor data DSD differs from the stored target value or range, the brake diagnostics module BD initiates an error condition in the brake controller BC. The brake diagnostics module BD preferably assesses the severity of the error condition based upon the amount by which the relevant direct sensor data DSD varies from its target value or range, and the brake diagnostic module BD preferably also assigns a severity level to the error condition. The brake controller BC communicates the error condition from the brake diagnostics module BD to the motor drive MD for use by the motor drive.

Figure 7:
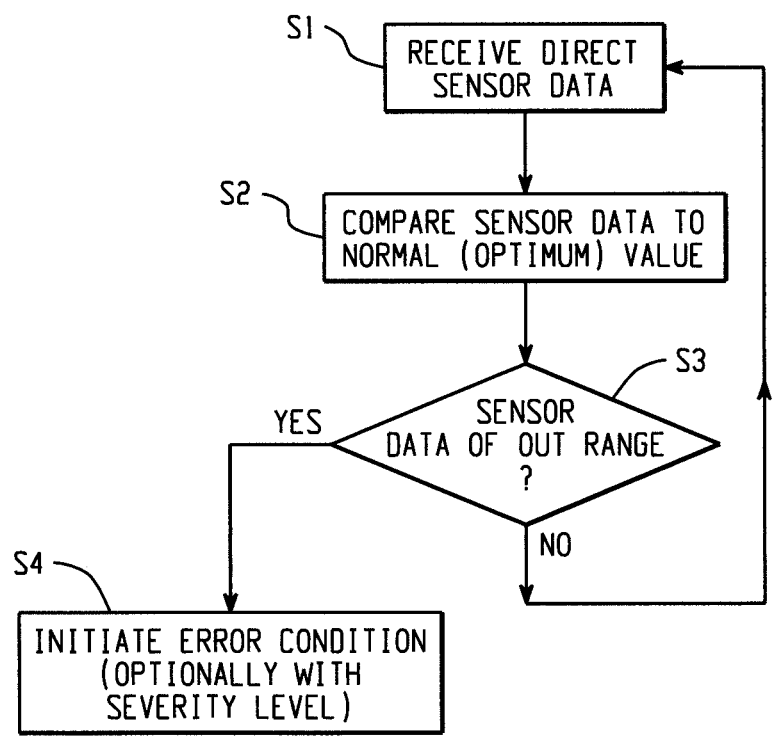
FIG. 7 is a flow chart that shows an example of a process for monitoring brake assembly sensor data according to an embodiment of the present development.

As shown in FIG. 7, in a step S1 the brake diagnostics module BD receives the direct sensor data DSD. In a step S2, the brake diagnostics module BD compares the direct sensor data DSD received in step S1 to normal or optimum values stored by the brake diagnostics module BD. In a step S3, the brake diagnostics module determines if the direct sensor data DSD is out of range, where out of range means greater than a maximum value, less than a minimum value, or otherwise not equal to a select optimum value, or outside a select optimum range of values. If the direct sensor data DSD is out of range, the brake diagnostics module BD initiates an error condition in a step S4. Otherwise, if the steps S2 and S3 determine that direct sensor data DSD is in the desired range, the process repeats with step S1 without initiating an error condition.

For example, direct sensor data DSD indicating a temperature or vibration in the brake assembly BA that is out of range will be flagged by the brake diagnostics module BD as an error, and the brake diagnostics module BD optionally also assigns a severity level to the error that increases with the magnitude that the direct sensor data DSD is outside of range. Upon receiving the error, the motor drive MD will either stop the motor M or adjust use of the motor M to lower the brake temperature or brake vibration to minimize the condition causing the error, depending upon the severity of the error, and/or the motor drive MD can communicate the error upstream to the motion control system MCS for providing output to a user to check the motor M.

Similarly, direct brake sensor data DSD that indicates that the biasing force of the spring(s) 36 has dropped below a minimum level is flagged by the brake diagnostics module MD as an error to be monitored based upon wear of the brake assembly BA over time.

In another example, direct sensor data DSD that indicates the movement of the armature and/or brake rotor 20 from their respective disengaged positions to their respective engaged positions, or from their respective engaged positions to their respective disengaged positions, is used by the brake diagnostics module in conjunction with time data in order for the brake diagnostics module BD to determine if the time for the armature 30 and/or rotor 20 to move from the engaged position to the disengaged position, or from the disengaged position to the engaged position, is greater than an optimum time limit and/or greater than a maximum time limit known and stored by the brake diagnostics module BD. If the time for such movement of the armature 30 and/or rotor 20 is greater than the optimum time limit but less than the maximum time limit, the brake diagnostics module BD initiates a warning condition for a deteriorating condition of the brake assembly BA. If the time for such movement of the armature 30 and/or rotor 20 is greater than the maximum time limit the brake diagnostics module BD initiates an error condition for a failure of the brake assembly BA, and the motor drive MD stops the motor M.

As shown in FIG. 3, the motor M further includes one or more motor vibration sensors MVS1,MVS2 located outside the brake assembly BA, but inside the motor housing H. In the example of FIG. 3, the first motor vibration sensor MVS1 is located in the housing space SP, and the second motor vibration sensor MVS2 is connected to the encoder E. In one example embodiment, the motor vibration sensors MVS1,MVS2 (sometimes generally referred to herein as "vibration sensor(s) MVS") each comprise 3-axis MEMS accelerometer sensors, but any other suitable vibration sensors can be used. As noted above, one or more of the motor vibration sensors MVS1,MVS2 is optionally provided as an acoustic sensors or ultrasonic acoustic sensors such as a microphone or ultrasound sensor located in the housing and providing acoustic data (sonic vibration data or ultrasonic vibration data) to the brake diagnostics module BD in response to a brake operation (engage or disengage) cycle of the brake assembly BA, wherein said acoustic data is used by the brake diagnostics module BD as described herein with reference to vibration data in general to assess an operative condition of the brake assembly. The vibration sensors MVS are oriented in such a way to detect vibration in axial, radial, and rotational directions on the motor M with respect to the axis of rotation of the rotor RT. Each vibration sensor MVS is operably connected to the brake diagnostics module BD and provides vibration input data VID (which can be sonic or ultrasonic data) to the brake diagnostics module BD that indicates the magnitude and preferably also the axis (i.e., x, y, or z axis) of the vibration sensed by the vibration sensor MVS1,MVS2. For example, movement of the brake rotor 40 during brake engagement or disengagement can be detected by sensors MVS oriented to detect axial vibration, while rubbing or dragging of the brake rotor 40 on the armature 30 or backing plate 14 can be detected by sensors MVS oriented to detect rotational vibration.

Figure 8:
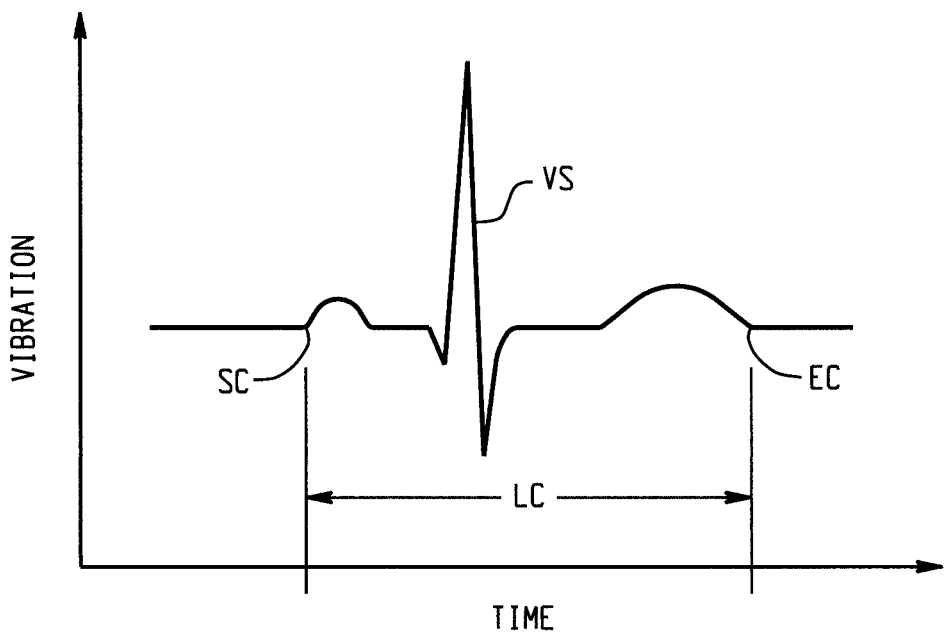
FIG. 8 is a graph of motor vibration over time and illustrates a normal or ideal vibration data spectrum VS for a brake engagement or disengagement cycle.
Figure 9:
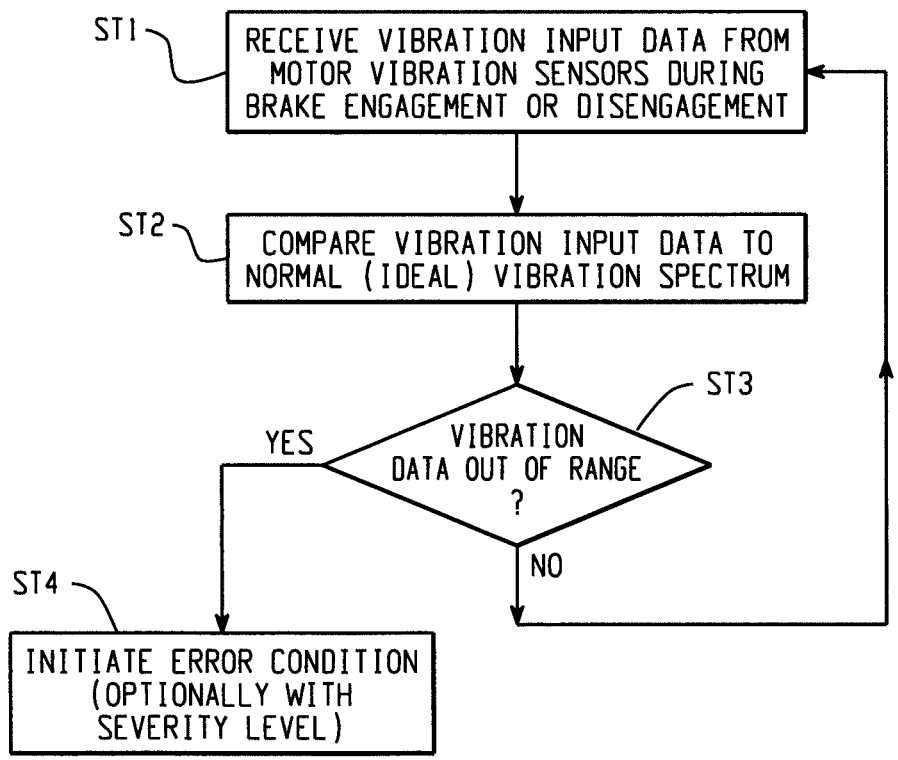
FIG. 9 is a flow chart that shows an example of a process for monitoring motor vibration data according to an embodiment of the present development.

In one embodiment, as shown in FIG. 9, the vibration sensors MVS1,MVS2 detect vibration in the motor M in response to movement of the brake armature 30 and brake rotor 40 during engagement and disengagement of the brake assembly BA, and provide such vibration data to the brake diagnostics module BD in a step T1. FIG. 8 shows a graph of motor vibration over time and illustrates a normal or ideal vibration data spectrum VS (which can be an acoustic spectrum defined by sonic or ultrasonic vibration data) for a brake engagement cycle or disengagement cycle (a brake engagement cycle or a brake disengagement cycle is generally referred to as a "brake operation cycle") for a healthy brake assembly, i.e., a brake assembly in a first (healthy or acceptable) operative condition or first (healthy or acceptable) operative state. According to the present development, such a normal vibration spectrum VS is stored in the brake diagnostics module BD for the brake engagement cycle and/or the brake disengagement cycle, and the actual vibration data spectrum defined by the actual vibration input data VID input to the brake diagnostics module BD during use of the motor M for a brake engagement cycle and/or brake disengagement cycle (i.e., a brake operation cycle) is compared to the corresponding normal vibration spectrum VS for the brake engagement or brake disengagement cycle in a step T2. As noted, the actual vibration data VID input to the brake diagnostics module BD can be sonic or ultrasonic vibration data that defines an actual acoustic spectrum. A step T3 determines if the vibration input data VID is out of range, such as when the vibration input data VID indicates that the motor M is vibrating more than a maximum allowed vibration amount at a given time in the brake engagement or brake disengagement cycle. When the vibration input data VID is out of range, i.e., the vibration input data VID deviates from the normal vibration spectrum representing the first (normal) operative state or first (normal) operative condition of the brake assembly by a select amount, the brake diagnostics module BD determines that the brake assembly is in a second (unhealthy or deficient) operative state or second (unhealthy or deficient) operative condition that differs from the first operative state or first operative condition and initiates an error condition in a step T4 in which it identifies such deviation as an error and optionally also assigns a severity level to the error that varies proportionally with the magnitude of the deviation, and the motor controller MC outputs such error data to the motor drive MD which can communicate the error to the motion control system MCS to inform a user of the system that the health, i.e., the operative condition or operative status, of the brake assembly BA is deteriorating or that the brake assembly BA has failed. Otherwise, if the vibration input data VID is determined in step T3 to be in range, the process restarts at step T1 for the next brake engagement and or disengagement cycle for the brake assembly BA. Pattern matching techniques can be used in the brake diagnostics module BD to analyze the vibration spectrum defined by the feedback data VID by comparing same with plurality of known vibration data spectrum patterns VS to classify a brake assembly BA as healthy, fair or faulty depending upon the closest pattern matched. The select known plurality of vibration data patterns VS can be preloaded into and/or learned in an adaptive fashion by the brake diagnostics module BD.

As shown in FIG. 8, the normal or ideal vibration spectrum VS has a start SC and an end EC corresponding to the start and end, respectively, of the brake engagement and/or disengagement cycle. The armature 30 moves axially during the time period between the start SC of the cycle and the end EC of the cycle. In another embodiment, the brake diagnostics module MD monitors the start SC and the end EC of the vibration input data VID during a brake engagement and/or disengagement cycle and determines the length (time) of the brake engagement/disengagement cycle LC based upon the time difference between the end of the cycle EC and the start of the cycle SC. Here, again, it is noted that the vibration input data can be sonic or ultrasonic vibration data. The length of the cycle LC (referred to as the actual brake cycle time) is determined by the brake diagnostics module BD and is compared to a corresponding stored maximum brake engagement cycle or disengagement cycle length (time) of the normal vibration spectrum VS (referred to as the stored maximum brake cycle time) and/or is compared to the brake cycle length LC of one or more previous brake engage/disengage cycles. The brake diagnostics module BD identifies as an error any out of range condition such as when brake engagement or brake disengagement cycle with a cycle length LC that exceeds the stored maximum brake cycle length for engagement or disengagement, respectively, and also optionally identifies a low severity error when the brake engagement/disengagement cycle length LC increases relative to one or more previous brake engagement/disengagement cycles by more than a select maximum amount. Undesired lengthening of the brake cycle length LC is used by the brake diagnostic module BD to predict an impending failure of the brake assembly BA and/or to identify the need for preventative maintenance of the brake assembly BA, and the brake diagnostics module BD provides output data to the motor drive MD and motor control system MCS concerning the impending failure and/or need for preventative maintenance so that the motor M can be shutdown and/or serviced by an operator.

Although the brake assembly BA as shown herein is located inside the motor housing H, it should be recognized that the brake assembly BA can be provided external to the motor housing H without departing from the overall scope and intent of the present development.

Figure 10:
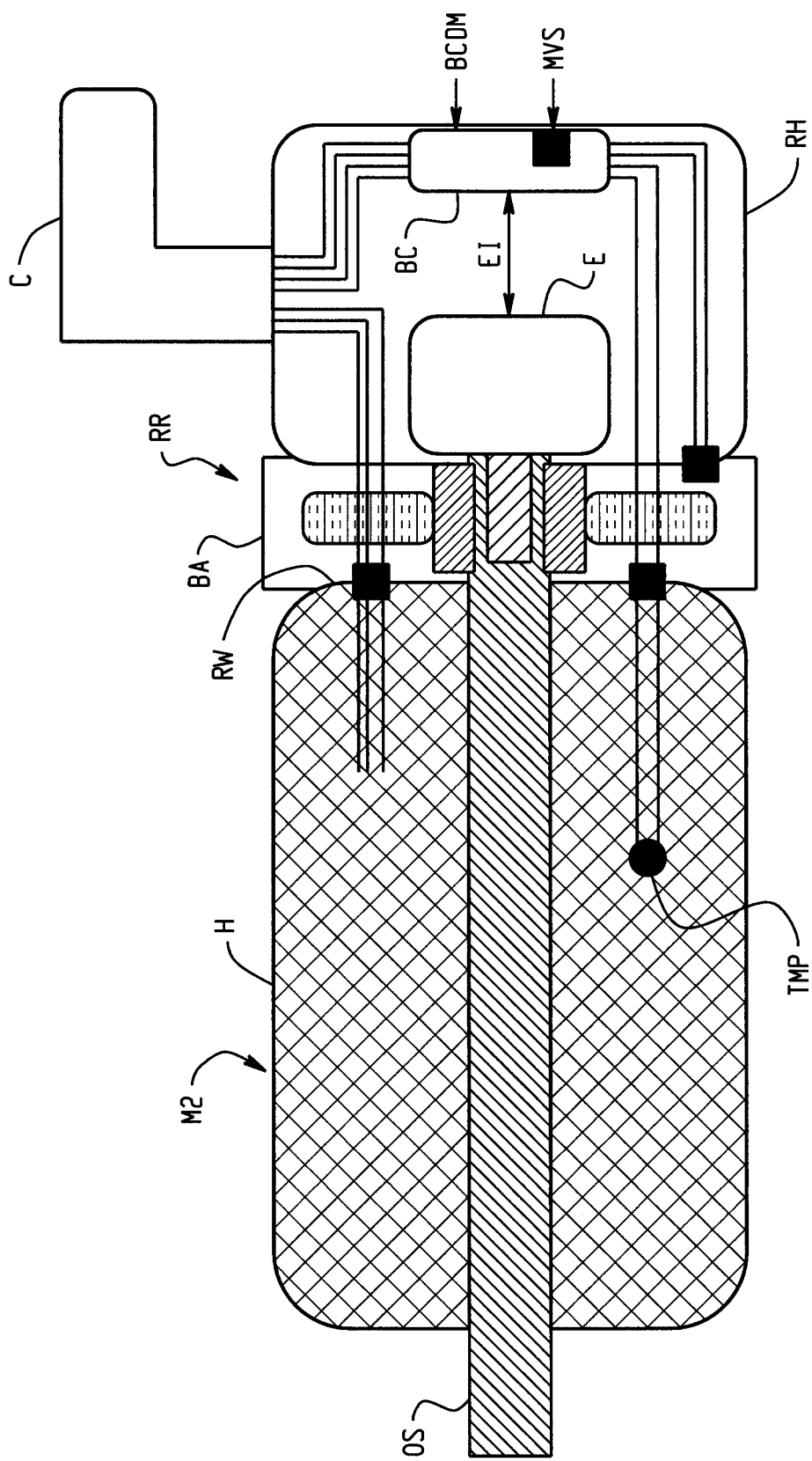
FIG. 10 illustrates another motor M2 provided in accordance with the present development.

FIG. 10 illustrates another motor M2 provided in accordance with the present development. The motor M2 is identical to the motor M except as otherwise shown and/or described herein. Like components relative to the motor M are identified with like reference characters and the description thereof is not necessarily repeated. The motor M2 includes a brake assembly BA located in a rear region RR of the motor M2. Alternatively, the brake assembly BA can be located external to the motor M2 and external to the rear housing assembly RH, and it is not intended that the present development be limited to the particular location of the brake assembly as shown in FIG. 10. In particular, a rear housing assembly RH is connected to a rear wall RW of the main motor housing H, and the brake assembly BA, encoder E and a brake controller BC (also referred to as the brake control and diagnostics module BCDM) are located in the rear housing assembly RH. The brake control and diagnostics module BCDM comprises a brake controller BC and brake diagnostics module BD as described above. The brake control and diagnostic module (BCDM) further includes a firmware system and is fitted with a vibration sensor MVS such as the motor vibration sensors MVS1 and/or MVS2 (the vibration sensor MVS can alternatively be located elsewhere in the rear housing assembly RH). The vibration sensor(s) can be an accelerometer or an acoustic vibration sensor such as a microphone. As used herein, the term vibration is intended to also encompass sonic and ultrasonic vibrations. The rear housing assembly RH includes the motor connector C as described above for input of power and for input and/or output of motor/brake control signals and motor/brake operational data to the motor drive MD (see also FIG. 5).

The brake control and diagnostics module BCDM also provides a data communications interface EI to the encoder E. The encoder E measures the position and speed of the rotor RT (FIG. 3). An optional motor temperature sensor TMP is included in the motor housing H and is operably connected to the brake control and diagnostics module BCDM to provide input of motor temperature data to the brake control and diagnostics module BCDM.

Figure 11:
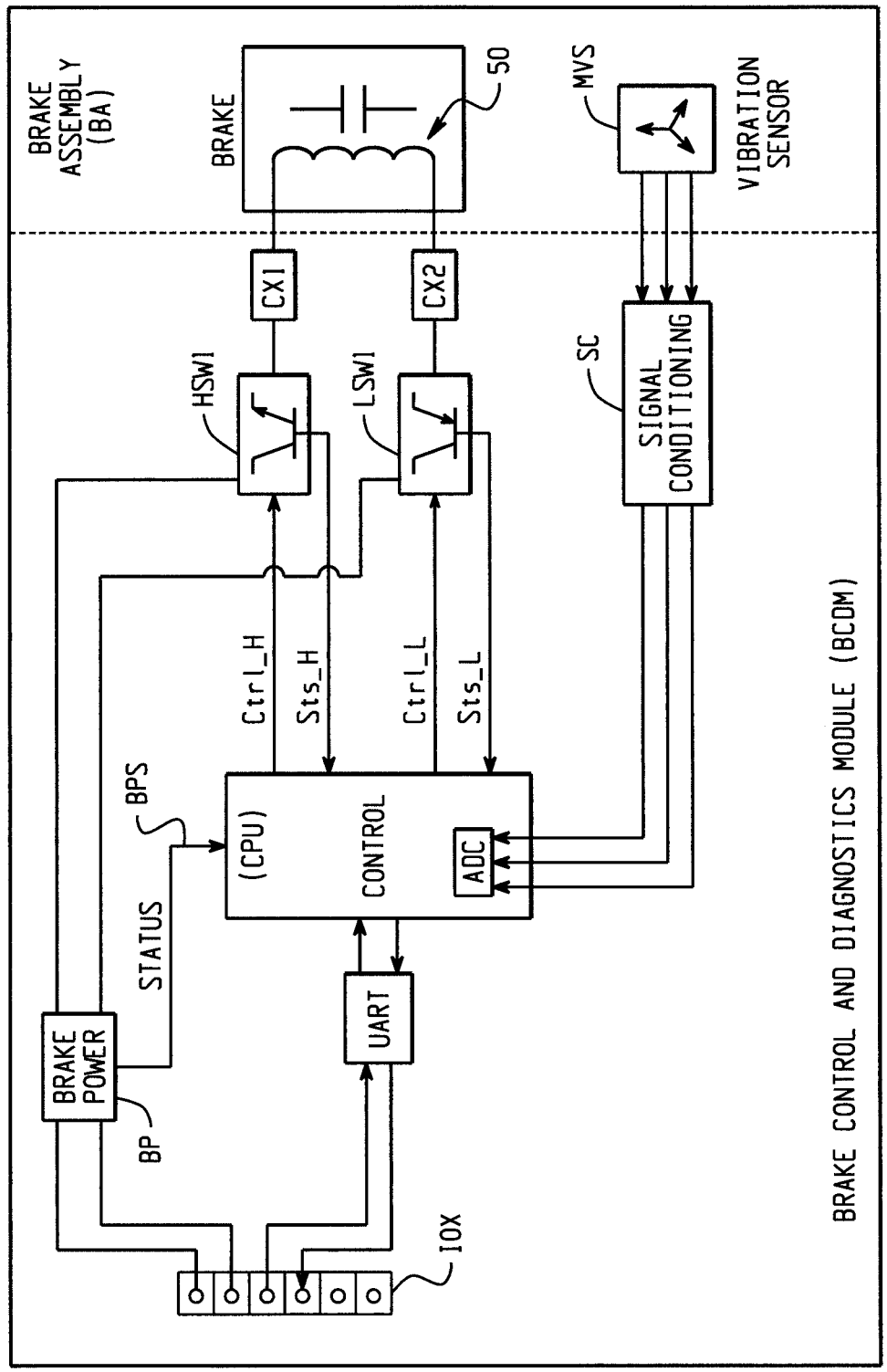
FIG. 11 provides a schematic view of one example of a brake control and diagnostics module BCDM.

FIG. 11 provides a schematic view of one example of a brake control and diagnostics module BCDM. The brake control and diagnostics module BCDM comprises first and second electrical connectors CX1,CX2 that are respectively connected to the high (input) side and low (output) side of the brake coil 50. The brake control and diagnostics module BCDM also includes an input/output connector IOX for input and output of power and data. The brake control and diagnostics module BCDM includes a central processing unit CPU such as a microprocessor or microcontroller that is programmed to perform the brake control and diagnostics functions described herein. The CPU can be connected to the input/output connector IOX through a Universal Asynchronous Receiver/Transmitter (UART) or another suitable interface.

The brake control and diagnostics module BCDM further includes a brake power circuit BP that receives electrical power through the connector C and input/output connector IOX and that provides operating electrical power voltage to the brake coil 50 to selectively disengage the brake assembly BA as described above. The brake power circuit BP further outputs a brake power status indicating signal BPS to the CPU to indicate to the CPU that operational electrical power is available at the brake power circuit BP.

The brake control and diagnostics module BCDM includes a first (high-side) solid state brake coil switch HSW1 and a second (low-side) solid state brake coil switch LSW1 that are operably connected respectively to the high (input) side and low (output) side of the brake coil 50 via first and second connectors CX1,CX2. The first and second brake coil switches HSW1,LSW1 are controlled between their conductive and nonconductive states by the CPU to selectively connect and disconnect the high and low sides of the brake coil 50 to the brake power circuit BP. In particular, the CPU controls the conductive states of the first and second switches HSW1,LSW1 with respective first and second control signals Ctrl_H and Ctrl_L. When both the first and second switches HSW1,LSW1 are in the conductive state, the brake coil 50 is energized by electrical power from the brake power circuit BP and the brake assembly BA is disengaged. When both (or either one of) the first and second switches HSW1,LSW1 are in the nonconductive state, the brake coil 50 is deenergized and the brake assembly BA is engaged by its springs or permanent magnets. The use of two switches HSW1,LSW1 increases safety to ensure that the brake coil 50 will be deenergized and the brake will be automatically engaged in the event either one or both of the switches is in the nonconductive state.

The first and second brake coil switches HSW1,HSW2 respectively output first and second brake coil switch status feedback signals Sts_H, Sts_L to the CPU to indicate their conductive state to the CPU. If the status feedback signal Sts_H,Sts_L does not match the respective control signal Ctrl_H,Ctrl_L for a given switch HSW1,LSW1, a fault condition is initiated by the CPU which can include the CPU controlling both switches to be in the non-conductive state so that the brake assembly is automatically engaged for safety.

As noted above, the motor M2 includes one or more vibration sensors MVS connected to the brake assembly BA or other part of the motor M2. The vibration sensor(s) MVS (MVS1,MVS2) are operably connected to a signal conditioning circuit SC of the brake control and diagnostics module BCDM which is, in turn, operably connected to the CPU through an analog-to-digital converter (ADC) provided as part of and/or operably connected to the CPU. The signal conditioning circuit SC filters noise from the output signals of the vibration sensors MVS and also scales the output signals of the vibration sensors (e.g., accelerometers) to meet the interface requirements of the analog-to-digital converter ADC inside the brake controller and diagnostic module CPU.

This arrangement allows the vibration sensor MVS of the brake control and diagnostics module BCDM to capture vibration caused by the movement of mechanical elements of the brake assembly BA as they engage and disengage the rotating shaft OS of the motor M2, and further allows for communications interface to the motor drive MD and communications interface to the encoder E.

Figure 12:
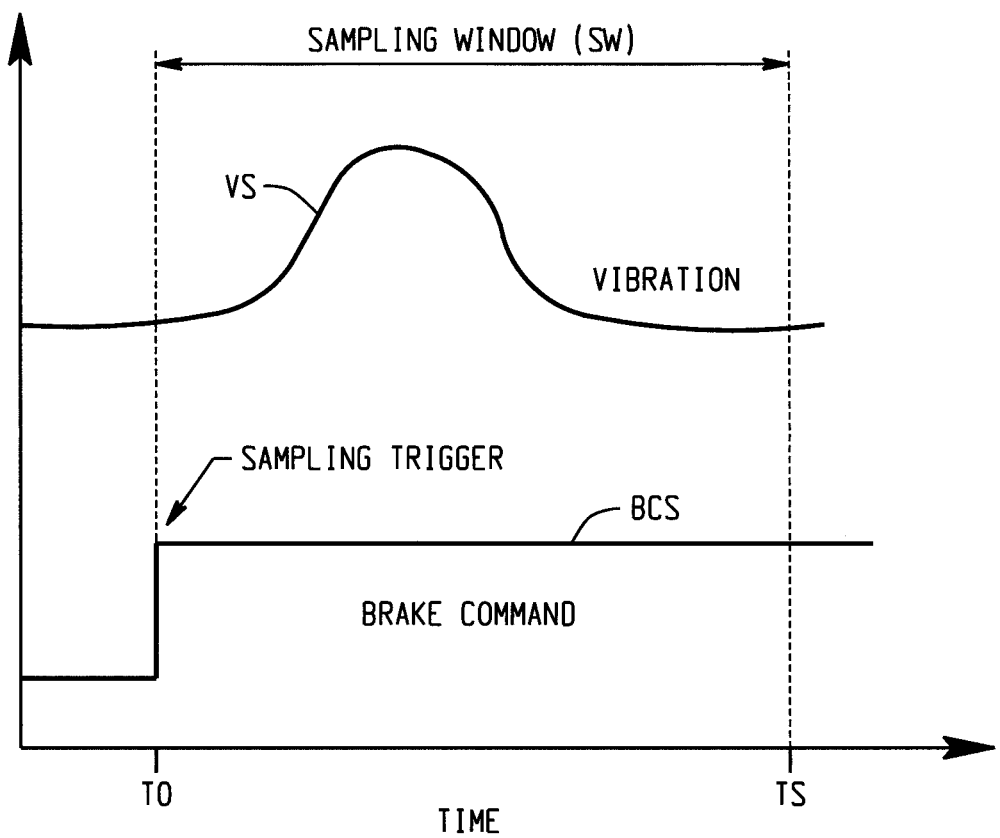
FIG. 12 is a graph that illustrates a vibration data sampling window that is initiated based upon a change in state of a brake command signal.

In one embodiment, the brake control and diagnostics module BCDM triggers sampling of vibration data from the sensor(s) MVS when the CPU of the brake control and diagnostics module BCDM receives a command from the motor drive MD to engage or disengage the brake assembly BA at the beginning or end of a motion cycle of the motor M2. This is illustrated in FIG. 12, wherein it can be seen that a change in state of the brake command signal BCS at a time T0 causes the vibration spectrum signal VS to be sampled in a sampling window SW for a set amount of time TS based on the apriori knowledge of the brake assembly engage and release delays associated with the particular brake being used inside the motor M2. Sampled vibration data (the vibration spectrum signal VS) is stored in internal memory (volatile) of the CPU for processing in the background for diagnostics.

In the motor M2, the brake control command signal BCS from the motor drive MD can be sent to the brake control and diagnostics module BCDM either:

a) directly using the drive communications interface between the motor drive MD and the brake control and diagnostics module BCDM; and/or b) indirectly through the encoder E wherein the motor drive MD first relays the brake command signal BCS to the encoder E using the motor drive to encoder communications interface and the encoder E further relays the brake commands to the brake control and diagnostics module BCDM through the data communications interface EI between encoder and the BCDM as shown in FIG. 10.

Using the arrangements as described above, a brake condition diagnostic method is provided indicate to the user when faults develop in the brake assembly BA of the motor M,M2. Faults related to the moving elements of the brake assembly BA can be detected analyzing the vibration signals VS provided by the one or more vibration sensors MVS1, MVS2 or similar sensors. In particular, as electrical power is applied to the electromagnetic coils 50 of the brake assembly 50 to produce magnetic flux that engages or disengages the brake assembly BA, vibration of the motor shaft OS and surrounding components of the brake assembly BA will be result as shown in FIG. 12. As noted above, the CPU of the brake control and diagnostics module BCDM triggers sampling of vibrations from the vibration sensor(s) MVS via the analog-to-digital converter ADC when the CPU receives a command from the motor drive MD to engage or disengage the brake assembly. This sampling window SW as shown in FIG. 12 varies in duration based on normal or expected engage or disengage brake cycles for a particular brake assembly BA installed in the motor M2. With a priori knowledge of the brake assembly cycle times, the CPU adjusts the sampling window SW to suitable values to ensure that the relevant vibration data VS is obtained. A sampling frequency of 10 kHz or higher is used by the CPU to preserve the dynamic dominant components of vibration.

In the CPU, characteristic features of the sensed vibration VS are obtained in the frequency domain using Fast Fourier Transforms or Discrete Fourier transforms. The health of the brake assembly BA presents itself in different discrete frequency ranges. Knowing the spectrum of a healthy brake assembly enables the distinction of faulty brakes using frequency domain features. According to an aspect of the present development, two main characteristic features in the frequency domain that are useful for distinguishing between healthy and faulty states of the brake assembly BA are:

i) RMS (root mean square) of the power spectrum of dominant frequencies (total or average RMS); and, ii) the peak value of the dominant frequency in the range of interest.

The present method according to the present embodiment recognizes that faulty states for a brake assembly BA result in dominant frequencies in a much lower range as compared to dominant frequencies in a higher range for a healthy brake assembly BA, i.e., the vibration spectrum VS resulting from a faulty brake assembly BA will exhibit dominant frequencies in a low frequency range (such as in a frequency range of 100-1000 Hertz (Hz)) while the vibration spectrum VS resulting from a healthy brake assembly BA will exhibit dominant frequencies in a high frequency range (such as in a frequency range of 1001-5000 Hz). Consequently, to isolate and study any lower frequencies, the measured vibration signals VS from the sensor(s) MVS are passed through one or more low-pass or band-pass filters with different pass frequencies to obtain a low frequency region of interest before FFT is performed on the low frequency region of interest signal. In one non-limiting example according to a particular embodiment, the vibrations signals from the sensor(s) MVS are passed through a 1000 Hz low pass filter to obtain the low frequency region of interest vibration data. The low-pass filtered signals (the low frequency region of interest signals) are then converted to frequency domain using FFT/DFT to obtain low frequency vibration data. Once in the frequency domain, the low frequency data signals are processed to determine and store:

(i) the RMS value of the dominant signals thereof (total or average RMS); and, (ii) the peak frequency value in the range.

As noted, healthy brake assemblies exhibit vibration frequencies in a higher frequency range as compared to unhealthy brake assemblies BA. As such, the output VS of the vibration sensor(s) MVS is also passed through one or more high pass or band-pass filters to isolate higher frequencies from the vibration spectrum VS to obtain a high frequency region of interest. After filtering to obtain the high frequency region of interest, the high frequency region of interest signals are converted into the frequency domain using FFT/DFT to obtain high frequency vibration data. Once in the frequency domain, these signals are also processed to determine and store:

(i) the RMS value of the dominant signals thereof (total or average RMS); and, (ii) the peak frequency value in the range.

Generally speaking, a healthy brake assembly BA will exhibit higher RMS values and a higher peak frequency values for the high frequency region of interest data as compared to the low frequency region of interest data. Accordingly, the health of the brake assembly can be assessed by one or more of the following:

i) determining that the brake assembly BA is unhealthy if the total or average RMS values of the low frequency data exceed a threshold;

ii) determining that the brake assembly BA is unhealthy if the peak frequency value of the low frequency data exceeds a threshold;

iii) a combination of i) and ii) above;

iv) determining that the brake assembly BA is unhealthy if the total or average RMS values of the high frequency data fall below a minimum;

v) determining that the brake assembly BA is unhealthy if the peak frequency value of the high frequency data falls below a minimum;

vi) a combination of iv) and v) above;

vii) determining that the brake assembly is unhealthy if the total or average RMS values and/or the peak frequency values of the low frequency data exceed the corresponding total or average RMS values and/or peak frequency values of the high frequency data by more than a select amount.

Figure 13:
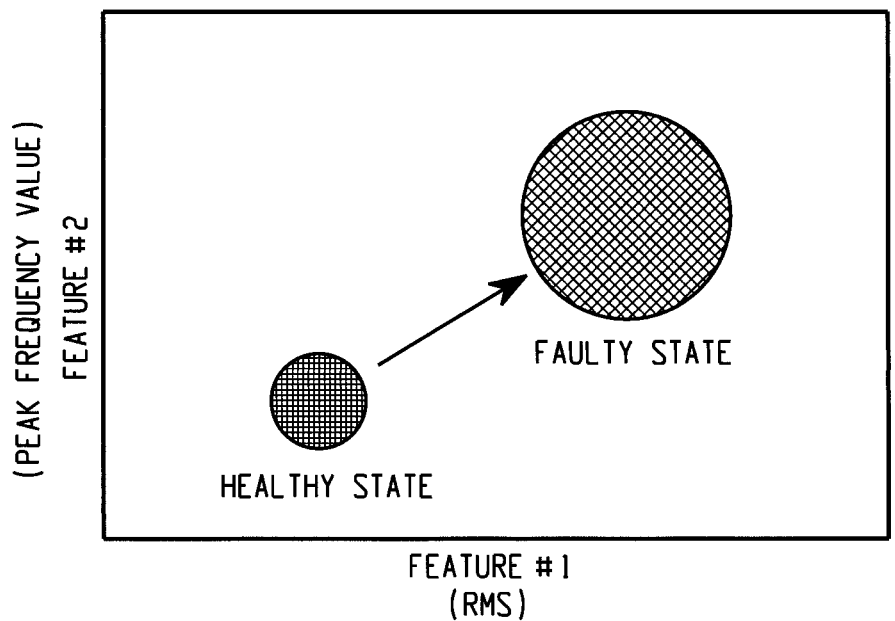
FIG. 13 is a clustering graph that illustrates clustering of vibration data features over time to indicate a healthy state or faulty state.

In one example, K-means clustering or a similar clustering method is performed on the RMS and peak data derived for both the low frequency and the high frequency data, for multiple (e.g., every) operation of the brake assembly BA to assess the heath of the brake assembly BA. As shown in FIG. 13, the k-Means or other clustering method groups the extracted features (RMS & peak frequency) over time. As more and more vibration features are extracted during operation of the brake assembly BA, data points tend to cluster around known states HS,FS for a healthy brake and a faulty brake, respectively. In this case two known classes/states are chosen to represent healthy and faulted brakes. Group/cluster means are pre-initialized with a priori knowledge of the brake system including the RMS and peak frequencies for healthy and faulty brake assemblies. As new data points are generated during operation of the brake assembly for each engage or disengage cycle, the new data points are grouped in the clustering data based on their distance from group centers. This algorithm is fast and simple to implement and yields good results with pre-trained data sets. In general, a healthy brake assembly BA should exhibit a narrowly clustered vibration around a center of lower magnitude and radius in lower frequency spectra and a faulty brake assembly BA should exhibit a wider cluster around a higher center (amplitude) with larger radii. When the faulty state data cluster FS grows to a certain absolute size and/or when the faulty state data cluster FS reaches a size that is a select size relative to the healthy state data cluster HS, the CPU initiates a fault condition that indicates that the brake assembly requires maintenance and can optionally render the brake assembly inoperative (locked in the engaged state) depending upon the severity of the fault based upon the absolute or relative size of the faulty state cluster FS.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A motor comprising:
a housing including a rotor and a stator;
a brake assembly adapted to restrain rotation of the rotor;
a brake controller comprising a brake diagnostics system;
at least one vibration sensor located in the housing and providing vibration data to the brake diagnostics system in response to a brake operation cycle of the brake assembly, wherein said vibration data is used by the brake diagnostics system to assess an operative condition of the brake assembly;
wherein:
said brake diagnostics system samples vibration data from said at least one vibration sensor during a sensing window time period that begins when said brake controller initiates said brake operation cycle and that ends a set amount of time after said brake controller initiates said brake operation cycle such that said brake diagnostics system samples vibration data from said at least one vibration sensor during said sensing window time period;
said brake diagnostics system isolates a low frequency region of interest of said vibration data and isolates a high frequency region of interest of said vibration data; and
said brake diagnostics system assesses said operative condition of the brake assembly by comparing frequency domain values of at least one of: i) a first RMS value of the low frequency region of interest to a second RMS value of the high frequency region of interest ii) a first peak value of the low frequency region of interest to a second peak value of the high frequency region of interest;
said brake diagnostics systems assigns said operative condition of the brake assembly as one of: (i) a healthy brake assembly; (ii) a faulty brake assembly that requires maintenance based upon at least one of: (i) said comparison of said first and second RMS values; (ii) said comparison of said first and second peak values.

2. The motor as set forth in claim 1, wherein:
said brake diagnostics system assesses said operative condition of the brake assembly by comparing frequency domain values of both: i) said first RMS value of the low frequency region of interest to said second RMS value of the high frequency region of interest ii) said first peak value of the low frequency region of interest to said second peak value of the high frequency region of interest; and,
said brake diagnostics systems assigns said operative condition of the brake assembly as one of: (i) said healthy brake assembly; (ii) said faulty brake assembly that requires maintenance based upon both: (i) said comparison of said first and second RMS values; (ii) said comparison of said first and second peak values.

3. The motor as set forth in claim 2, wherein said low frequency region of interest comprises frequencies less than or equal to 1000 Hz.

4. The motor as set forth in claim 2, wherein, for both said low frequency region of interest and said high frequency region of interest, said brake diagnostics system:
assigns said first RMS value to one of first and second different data clusters based upon said first RMS value;
assigns said second RMS value to one of said first and second data clusters based upon a said second RMS value;
assigns said first peak value to one of said first and second data clusters based upon a said first peak value;
assigns said second peak value to one of said first and second data clusters based upon a said second peak value.

5. The motor as set forth in claim 1, wherein said vibration sensor is a microphone and said vibration data is sound data.

6. A brake condition diagnostic method for an electric motor, said method comprising:
sensing vibration data from a vibration sensor located in a housing of a motor during a sensing window time period when a brake assembly cycles between an engaged condition and a disengaged condition, wherein said sensing window time period begins when a brake coil of said brake assembly is energized to move said brake assembly from said engaged condition to said disengaged condition and ends after a select amount of time;
filtering said vibration data to isolate a low frequency region of interest and a high frequency region of interest;
converting said filtered vibration data to a frequency domain to derive frequency domain vibration data;
assessing an operative condition of the brake assembly based upon at least one of: i) a first comparison between RMS values of said frequency domain vibration data for said low frequency region of interest and said high frequency region of interest; ii) a second comparison of peak values of said frequency domain vibration data for said low frequency region of interest and said high frequency region of interest;
assigning said operative condition of the brake assembly as one of: (i) a healthy brake assembly; (ii) a faulty brake assembly that requires maintenance based upon at least one of: (i) said comparison of said RMS values; (ii) said comparison of said peak values.

7. The method as set forth in claim 6, wherein:
said step of assessing said operative condition of the brake assembly comprises comparing frequency domain values of both: i) a first RMS value of the low frequency region of interest to a second RMS value of the high frequency region of interest and ii) a first peak value of the low frequency region of interest to a second peak value of the high frequency region of interest;
said step of assessing said operative condition of the brake assembly comprises for both said low frequency region of interest and said high frequency region of interest:
assigning each of said first and second RMS values to a respective one of first and second different data clusters based upon said RMS value;
assigning each of said first and second peak values to a respective one of said first and second different data clusters based upon said peak value;
assessing said operative condition of said brake assembly based upon at least one of: i) an absolute size of at least one of said first and second data clusters; ii) a relative size of said first and second data clusters as compared to each other.

\* \* \* \* \*